United States Patent [19]

Miyayama et al.

[11] Patent Number: 4,766,834

[45] Date of Patent: Aug. 30, 1988

[54] MARINE AUTOMATIC STEERING APPARATUS

[75] Inventors: Toshio Miyayama; Isao Masuzawa; Kanshi Yamamoto, all of Kuroiso; Mitsuo Watanabe, Nishi-nasumachi; Hidemitsu Yamada, Yokohama, all of Japan

[73] Assignee: Kabushiki Kaisha Tokyo Keiki, Tokyo, Japan

[21] Appl. No.: 12,351

[22] Filed: Feb. 9, 1987

[30] Foreign Application Priority Data

Feb. 17, 1986 [JP] Japan .................................. 61-32488

[51] Int. Cl.$^4$ ............................................ B63H 25/06
[52] U.S. Cl. .................................................. 114/144 E
[58] Field of Search .................... 114/144 E; 364/424; 371/9

[56] References Cited

U.S. PATENT DOCUMENTS 3,623,014 11/1971 Doetz et al. .................... 371/9 X
4,532,594 7/1985 Hosaba et al. .................... 371/9 X

FOREIGN PATENT DOCUMENTS 0214497 12/1983 Japan .............................. 114/144 E Primary Examiner—Sherman D. Basinger
Attorney, Agent, or Firm—Bauer & Schaffer

[57] ABSTRACT

A marine automatic steering apparatus in which a part or whole of its control circuit is doubled as dual steering control sections same in construction includes a non-volatile memory controlled by either of the dual steering control sections and in and from which data can be written and read out.

10 Claims, 3 Drawing Sheets

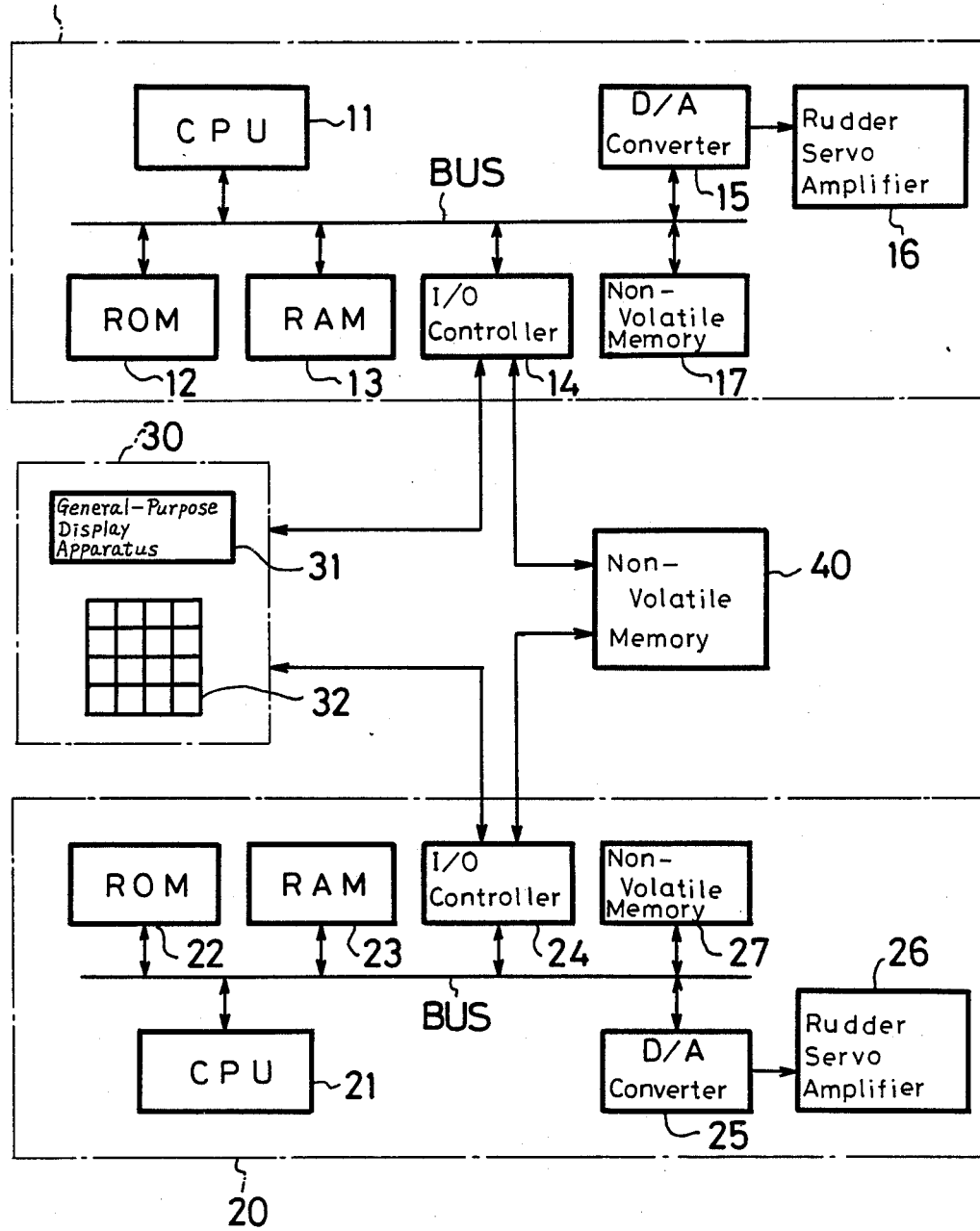

MARINE AUTOMATIC STEERING APPARATUS

BACKGROUND OF THE INVENTION

1. Field of the Invention

The present invention relates generally to automatic steering apparatus for marine vessels, the control circuit, or a part thereof is doubled, that is, two control circuits which are the same in construction are provided. More particularly, this invention relates to automatic steering apparatus having dual steering control circuits in which various kinds of setting values, (i.e. data and the like) with respect to the automatic steering of a ship can be interchanged between both dual steering control circuits while the data can be preserved therein, during switch over in use between the two control circuits.

2. Description of the Prior Art

The known automatic steering apparatus of this kind is illustrated, for example, in FIG. 1 in which the main portion of a steering control circuit is doubled, that is, constructed of two identical steering control sections 10 and 20.

The steering control sections 10 and 20, are provided common bus lines BUS through each of which CPUs (central processing units) 11 and 21 are connected to ROMs (read-only memories) 12 and 22, RAMs (random access memories) 13 and 23, I/O (input/output) controllers 14 and 24 and D/A (digital-to-analog) converters 15 and 25, respectively, Rudder servo amplifiers 16 and 26 are connected respectively to the D/A converters 15 and 25.

Since the circuit elements, as mentioned above, duplicate the main hardware portions of the control circuit, even if trouble occurs in one control circuit, the other control circuit may be used to carry out the steering. Consequently, this steering apparatus is deemed high in reliability.

Further, an indicating/setting section 30 is mounted on the upper panel portion (not shown) of the automatic steering apparatus. This indicating/setting (I/S) section 30 is provided with a general-purpose display 31, a keyboard 32 and similarly known input/output devices. This indicating/setting section 30 is powered when one of the steering control sections 10 and 20 is operated as is arranged to function under the control of the steering control section 10 or 20 that is operated.

The indicating/setting section 30 is used to set various kinds of functions such as setting a course, limiting a steering angle, setting an off-course alarm, setting a ship's speed pulse rate and the like which are carried out by the automatic steering apparatus. Further, various kinds of control parameters in the automatic steering such as a counter rudder, a rudder angle ration, a weather helm adjustment and so on must be changed at any time in response to the shape of a ship's hull, the condition of cargo loaded in the ship, the weather and so on. These changes are made manually in the indicating/setting section 30, too. However, when the automatic steering apparatus is constructed such that the control parameters are assumed automatically from the ship's response, relative to the rudder angle, these changes in settings are not necessary and power-saving steering in which the hull, the condition of cargo and so on are automatically taken into consideration and their function may be carried out automatically.

Suitable switch means may be provided with automatic steering apparatus constructed as shown in FIG. 1 to first select which of the steering control sections 10 and 20 is to be used initially and which is to be used as a secondary stand-by. Assuming that the steering control section 10 is primary selection, automatic steering apparatus is actuated, then the CPU 11 reads initial values of various kinds of setting values from the ROM 12 and sets the readout initial values in the RAM 13 at the storage areas of the respective set values. Thereafter, the CPU 11 starts the calculation and the control for the steering of ship in accordance with the program stored in the ROM 12. In the automatic steering mode, the CPU 11 supplies a rudder angle command to the rudder servo amplifier 16 through the D/A converter 15.

When a new setting value is inputted automatically by the indicating/setting section 30, the CPU 11 reads such setting value through the I/O controller 14 and replaces the same with the previously set value that is stored in the RAM 13. Further, when the setting values of the control parameters such as the rudder angle ratio, the counter rudder and so on, in the automatic steering mode, are changed or when newly estimated values are obtained, the CPU 11 replaces the previously estimated values stored in the RAM 13 with the above newly estimated values.

In the foregoing situation, the secondary steering control section 20 that was not selected is not powered and is inoperative.

When the ship is steered by the primary steering control section 10, and then switched to the secondary steering control section 20 because of trouble occuring in the primary steering control section 10, or due to other reasons, the power of the primary steering control section 10 must be cut and the steering control section 20 powered. Thus, the CPU 21 in the steering control section 20 becomes actuated and responsive to the initial setting values, such as setting a course, limiting a rudder angle, etc., and the various kinds of control parameters such as the rudder angle ratio and, the counter rudder, as originally stored in the ROM 22. As a result, the setting values and control parameters for operating the secondary control section 20 are at values different from the values controlling the steering control section 10 prior to its being switched which values are all lost on cut off power to steering control section 10. Therefore, when the steering control sections are switched from one to the other, these values and parameters must be set again to remain on the correct course. Further, on cut off of power, all control parameters in the automatic steering operation are returned to the initial values, and remain at such values until they are reset or until the correct value is obtained. Consequently the course keeping and course changing properties of the known automatic steering apparatus are defective and also power saving steering can not be made. This defect is very serious.

Accordingly, although the steering control sections may be switched from one to the other, in order that the last setting values, the control parameters and the like can be used continuously as they have been determined, prior to the switch, the dual steering control sections must be both powered and the necessary data must be transmitted at all times from the primary steering control section to the standby steering control section, although it is normally inactive. FIG. 2 shows an example of the prior art automatic steering apparatus constructed as described just above.

Referring to FIG. 2, when the marine automatic steering apparatus is actuated, both steering control sections 10 and 20 are powered and a data exchange signal line SL is provided between the I/O controllers 14 and 24 in order that the necessary data can be transmitted and received between both steering control sections 10 and 20. Other portions are formed the same as those in FIG. 1. Hence, they are identified by the same reference numerals and need not be described in detail.

Though not shown, the power source provided for the automatic steering apparatus is backed up by a battery in order to prevent the last setting values and the last control parameters from being lost, even if power interruption occurs.

In the prior art automatic steering apparatus shown in FIG. 2, however, when the dual steering control sections are switched from one to the other, in order that the last setting values and control parameters and the like are transmitted and received between the two steering control sections, both steering control sections must be powered. Thus, in order to prevent the data from being lost even when the power interruption occurs, the power source of both steering control sections must be backed up by the battery. As a result, power consumption is increased because in the operation mode the standby steering control section is powered constantly. Since both the dual steering control sections are powered, both steering control sections deteriorate in quality simultaneously. Thus, as compared with the system in which only the steering control section being operated is powered, the prior art automatic steering control apparatus shown in FIG. 2 is lower in reliability. Further, when the power source of the entire apparatus is turned off, the last setting values and control parameters, etc., are lost.

Accordingly, it is an object of this invention to provide an improved marine automatic steering apparatus having dual steering control sections which overcome the shortcomings encountered with the prior art marine automatic steering apparatus.

It is another object of this invention to provide an improved marine automatic steering apparatus having dual steering control sections in which during operation, the last data and control parameters can always be used, notwithstanding switch-over from primary to secondary sections.

It is further object of this invention to provide a marine automatic steering apparatus having dual steering control sections in which various kinds of setting values, data and the like can be transmitted and received between both of the dual steering control sections.

It is still further object of this invention to provide a marine automatic steering apparatus having dual steering control sections in which the power consumption is prevented from being increased, the operational characteristics are prevented from being lowered and the steering efficiency after the steering control sections are switched from one to the other is prevented from being deteriorated even temporarily.

SUMMARY OF THE INVENTION

According to one aspect of the present invention, there is provided an automatic steering apparatus in which a part of the whole of its control circuit is doubled providing two identical but separate steering control sections and an indicating/setting section is provided for indicating and setting various kinds of setting data and control parameters concerning the steering of a ship, comprising:

common non-volatile memory means controlled by either of said two same steering control sections and in and from which data can be written and read out.

These and other objects, features and advantages of the present invention will become apparent from the following detailed description of the preferred embodiment that is to be read in conjunction with the accompanying drawings, in which like reference numerals designate like elements and parts.

BRIEF DESCRIPTION OF THE DRAWINGS

FIG. 3 is a block diagram showing an embodiment of an automatic steering apparatus according to the present invention in which its control circuit is doubled.

DESCRIPTION OF THE PREFERRED EMBODIMENT

Figure 1:
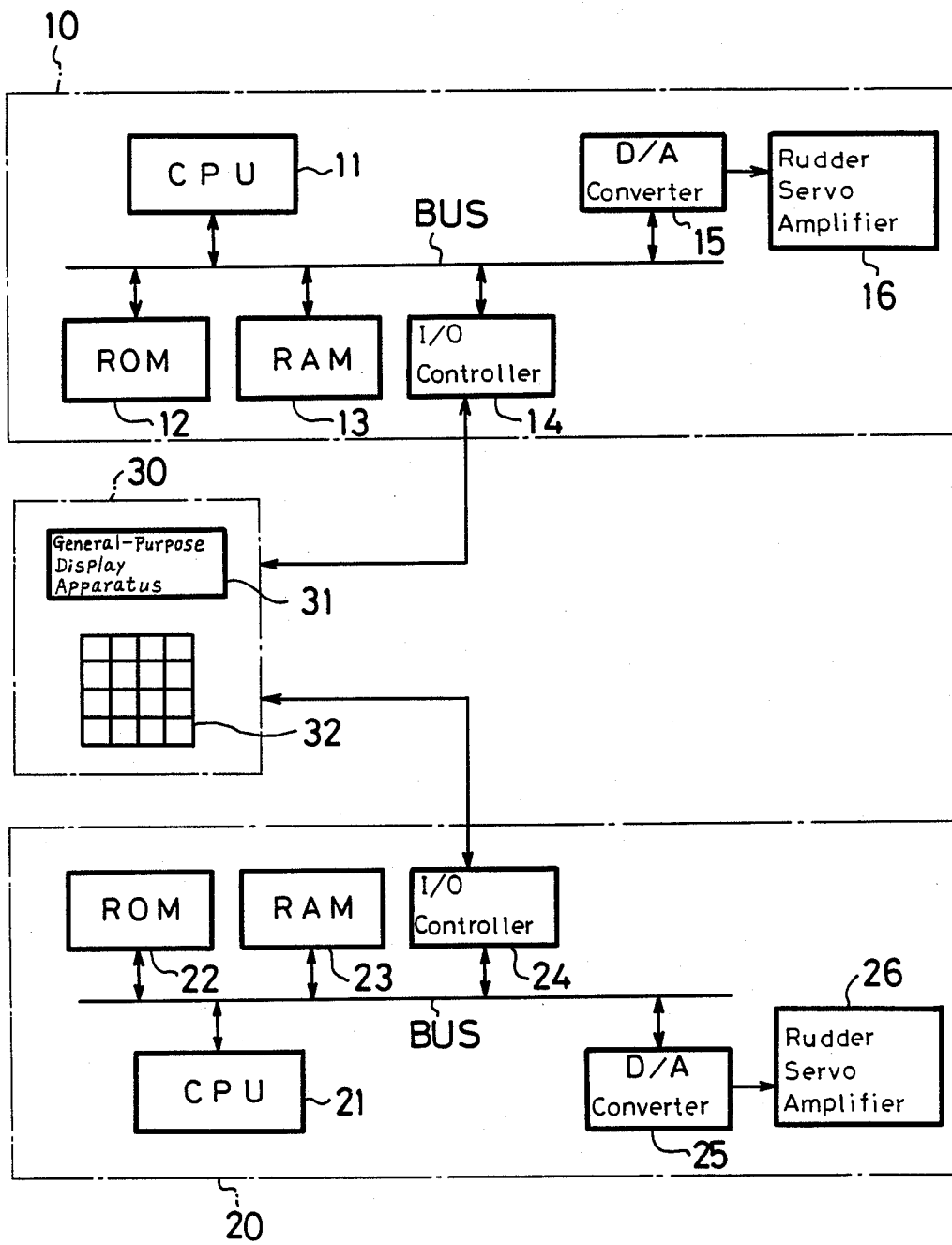
FIG. 1 is a block diagram showing an example of a prior art automatic steering apparatus in which its control circuit is doubled.
Figure 2:
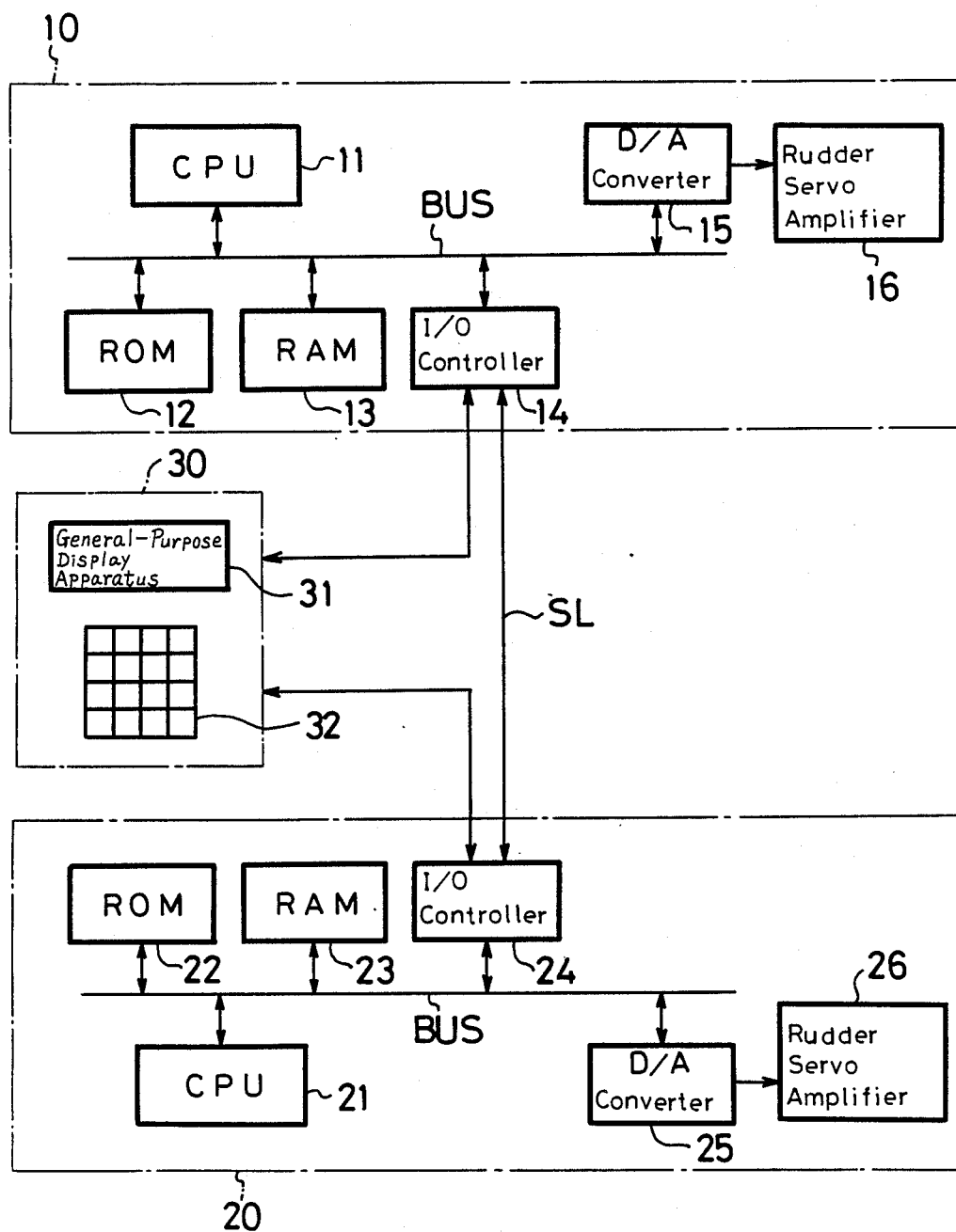
FIG. 2 is a block diagram showing another example of the prior art marine automatic steering apparatus in which data is transmitted and received between dual control circuits.

Now, an embodiment of an automatic steering apparatus according to the present invention will hereinafter be described in detail with reference to FIG. 3. Only the main portion of FIG. 3 constituting the present invention will be described as the other arrangements shown in FIG. 3 are similar in structure and function to those described in relation to FIG. 1 and need not be described.

Referring to FIG. 3, a common non-volatile memory 40 is provided which is connected through the I/O controllers 14 and 24 to the bus lines BUS of the steering control sections 10 and 20, respectively. The non-volatile memory 40 is so formed that when either the steering control section 10 or 20 is selected and made operative, the non-volatile memory 40 is powered and under the control of the steering control section selected so that data is written in and/or read out from this non-volatile memory 40. Further, there are provided non-volatile memories 17 and 27 that are respectively connected to the bus lines BUS in the respective steering control sections 10 and 20 and used only for the same. The non-volatile memories 17 and 27 are adapted respectively to back up the function of the non-volatile memory 40 when trouble occurs in the non-volatile memory 40.

Let is now be assumed that the steering control section 10 be selected as the primary unit to be operated. Then, the CPU 11 thereof will carry out the calculation and the control with respect to the steering and at the same time, control and indicating/setting sections 30. Each time various setting values such as the course setting value, the rudder angle limiting values and so on with respect to the steering control operation and data of various kinds of control parameters such as the counter rudder, the rudder angle ratio, the weather adjustment and so on are up-dated, the CPU 11 allows such data to be written in the non-volatile memory 40. For instance, when various kinds of the setting values are altered by the indicating/setting section 30, the CPU 11 allows the newly set values to be written in the corresponding data areas of the non-volatile memory 40. Also, when the setting of the control parameter is altered or when the newly estimated value is obtained, the CPU 11 allows such newly estimated value to be written in the corresponding data area of the non-volatile memory 40, similarly. Further, the CPU 11 allows the data stored in the non-volatile memory 40 to be copies in the non-volatile memory 17 associated with it in the steering control section 10.

Under the condition that the most up-to-date setting value and the control parameter are always stored in the non-volatile memory 40 as described above, if the steering control section 10 is switched to the other or standby steering control section 20, the power source of the steering control section 10 is turned off, while the power source of the steering control section 20 is turned on. Thus, the CPU 21 in the newly selected steering control section 20 starts the calculation and the control with respect to the steering of the ship. At the same time, the secondary CPU 21 continues to control the indicating/setting section 30 without interruption. In this case, since the data can be written in and read out of the non-volatile memory 40 in response to the command issued from the CPU 21, when various kinds of setting values and control parameters are read out of the non-volatile memory 40 by the CPU 21, the last setting values and data before the switching can be used continuously even after the switching. Each time various kinds of setting values and the control parameters are renewed, the CPU 21 permits the corresponding data within the non-volatile memory 40 to be rewritten. Further, the CPU 21 always allows the data stored in the non-volatile memory 40 to be copied in the non-volatile memory 27.

As described above, since the non-volatile memory 40 is capable of transmitting and receiving data equal between the steering control sections 10 and 20, even when the steering control sections 10 and 20 are switched from one to the other, the most recent data such as the last setting values, control parameters and the like can always be continously used. Accordingly, it is possible to construct the system in which, when the steering control sections 10 and 20 are switched, it is not necessary to carry out the resetting or to set and estimate the control parameters again and in which even when the power source of the steering control section placed in the standby mode is turned off, the automatic steering apparatus can be prevented from being lowered in function by the switching of the steering control section.

Further, since the latest setting values and the latest control parameters are written in the non-volatile memory 40, even if the power source is turned off or the power interruption occurs while the apparatus is being operated, these data can be preserved. Thus, when the automatic steering apparatus is reactivated, it is possible to continue to use the last setting values, the last control parameters and the like without loss similarly to the case where one steering control section is switched to the other steering control section.

Furthermore, even if trouble should accidentally occur in the non-volatile memory 40, the data in the non-volatile memory 40 are copied in the special non-volatile memories 17 and 27 of the respective steering control sections 10 and 20 so that it will be possible to steer the ship without memory 40 by using such data stored in the special non-volatile memories 17 and 27.

While the single indicating/setting section 30 is selectively used by both the steering control sections 10 and 20 in the embodiment as mentioned above, it is possible to provide a special indicating/setting section in each of the respective steering control sections 10 and 20.

Alternately, the non-volatile memory 40 is connected through the I/O controllers 14 and 24 in the respective steering control sections 10 and 20 in their bus lines BUS. It may be desired to connect the non-volatile memory 40, directly to the bus lines BUS in each of the respective steering control sections 10 and 20. In addition, when it is not necessary to consider the occurrence of a trouble in the non-volatile memory 40, the special non-volatile memories 17 and 27 in the respective steering control sections 10 and 20 may be dispensable.

According to the present invention, as set forth above, the common non-volatile memory, is provided so as to transmit and receive the data between both the steering control sections and to preserve the same. Accordingly, whether or not the dual steering control sections are switched; the power source of the automatic steering apparatus are turned off, or, power interruption occurs, the last setting value and control parameter will be usable upon initiating or reinstituting operation. Therefore, even though the automatic steering apparatus of the invention has the dual steering control sections, the power consumption is prevented from being increased, operational properties of the steering apparatus is prevented from being lowered, and steering efficiency, after the steering control sections are switched, are prevented from even temporarily deteriorating.

When the steering control section, which is not selected, that is, placed in the standby mode is operated, as for example, so as to detect the abnormality of the selected or operating steering control section or the like, the non-volatile memory makes it unnecessary for the steering control section that is not selected to receive the renewed data such as the renewed setting values or so on from the steering control section selected. Therefore, the respective steering control sections can be operated independently. Thus the automatic steering system or apparatus can be simplified in construction.

Further, when each of the steering control sections is provided with the special non-volatile memory, even if trouble occurs in the common non-volatile memory, it is possible to back up such troubled common non-volatile memory by the special non-volatile memories.

The above description is given on a single preferred embodiment of the invention, but it will be apparent that many modifications and variations could be affected by one skilled in the art without departing from the spirits or scope of the novel concepts of the invention so that the scope of the invention should be determined by the appended claims only.

We claim as our invention:

1. In an automatic steering apparatus for maritime vessels having a control circuit provided in whole or in part with duplicate steering control sections and an indicating/setting section for inputting selected setting and control parameters data for the steering of the vessel, the improvement comprising:
   a common non-volatile memory means, connected to each of said duplicate steering control sections, said common non-volatile memory means being selectively controlled by either one of said duplicate steering control sections, said selected one operating such that data can be written in and read out from said non-volatile memory means.

2. A marine automatic steering apparatus according to claim 1, in which each of said duplicate steering control sections comprising:

a common bus line; means connected to said common bus line for carrying out the calculation with respect to the steering of a ship and controlling the steering operation; means connected to said common bus line for storing initial values of various kinds of setting values concerning the steering and control of a ship; means connected to said common bus line for setting in its storage areas said setting values; control means connected to said common bus line and said non-volatile memory means for controlling the input and output of data; means for converting a rudder angle data in the form of a digital data to an analog data; and rudder servo amplifier means supplied with the analog data from said converting means for controlling a movement of a rudder of the ship.

3. The apparatus according to claim 2, wherein said calculating and controlling means is a micro-computer.

4. The apparatus according to claim 2, wherein said storing means is a read-only memory.

5. The apparatus according to claim 2, wherein said setting means is a random access memory.

6. The apparatus according to claim 2, wherein said control means is an I/O (input/output) controller.

7. The apparatus according to claim 2, wherein said converting means is a digital-to-analog converter.

8. The apparatus according to claim 1, wherein said indicating/setting section is formed of a multi-purpose display and a keyboard.

9. The apparatus according to claim 1 further comprising:

non-volatile memory means provided in each of said two same steering control sections which are connected to said common bus line means.

10. The apparatus according to claim 9, wherein said non-volatile memory means is used to back up a function of said common non-volatile memory means when a trouble occurs in said common non-volatile memory means.

* * * * *